United States Patent Office 3,188,358
Patented June 8, 1965

3,188,358
PREPARATION OF METHYLPENTALANE
Abraham Schneider, Overbrook Hills, Pa., assignor to Sun Oil Company, Philadelphia, Pa., a corporation of New Jersey
No Drawing. Filed Aug. 7, 1962, Ser. No. 215,286
12 Claims. (Cl. 260—666)

This invention relates to the preparation of methylpentalane from hydrindane by means of an aluminum halide catalyst. The invention also embraces the preparation of dimethylperhydropyrene as an additional product of the reaction.

Hydrindane is a dicyclic $C_9$ naphthene hydrocarbon having the following structure:

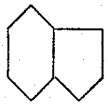

It can exist in both cis and trans forms which have boiling points of about 166° C. and 159° C., respectively. Hydrindane can be derived by hydrogenating either indane or indene, which aromatics can be made from coal tar and petroleum fractions in known manner.

The present invention provides a process for converting hydrindane to methylpentalane which has the following structure:

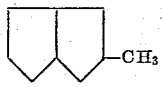

The methylpentalane obtained in the process is at least mainly the isomer shown above with the methyl group located at the 2-position, although a minor amount of 1-methylpentalane may also be present. The methylpentalane produced in the reaction has a boiling point approximating 150° C. and it exhibits only a single sharp peak when the reaction product is analyzed by vapor phase chromatography.

In accordance with the invention methylpentalane is prepared by contacting hydrindane, which can be either the cis or trans form or a mixture of these isomers, with an aluminum halide catalyst at a temperature in the range of −10° C. to 50° C., more preferably −5° C to 10° C. After sufficient contacting of the hydrocarbon with such catalyst, methylpentalane can be separated from the reaction mixture in good yield by distillation. When the reaction is carried out at low temperature within the range specified, small amounts of $C_4$–$C_7$ paraffins are formed as by-products, while at relatively high temperatures additional by-products are formed as hereinafter shown.

As a further aspect of the invention dimethylperhydropyrene can be produced as an additional product of the reaction. This is a $C_{18}$ polycyclic naphthene having four condensed rings and two methyl substituents. As obtained in the present process, this compound appears to be a single isomer having the following structural formula:

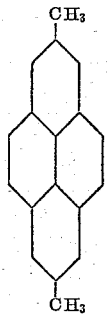

It is a normally solid crystalline material having a melting point of about 187–190° C. When it is desired to obtain this compound in good yield in addition to methylpentalane, contact of the hydrindane with the aluminum halide catalyst should be carried out at a temperature in the range of 20–50° C. The dimethylperhydropyrene can readily be separated from other hydrocarbon products by crystallization from the reaction mixture at temperatures, for example, of 0–32° C. Its separation can also be done easily by distillation, since it is much higher boiling than any other product obtained from the reaction.

The formation of methylpentalane from hydrindane in the present process is due to an isomerization reaction which, as I have discovered, favors the pentalane type of structure over the hydrindane type. The formation of dimethylperhydropyrene, however, is due to a different type of reaction that involves dimerization. The mechanism for this appears to be as follows. As the methylpentalane content builds up in the reaction mixture, there is a tendency for one of its rings to rupture especially at the higher reaction temperatures. This causes the formation of a $C_9$ unsaturated monocyclic material which then becomes saturated by abstraction of hydrogen from either the unreacted hydrindane or the uncracked methylpentalane product or both. Whether the hydrogen is abstracted preferably from the hydrindane or the methylpentalane product is not known; but in any event one or the other or both of the $C_9$ dicyclic components lose hydrogen and, under the influence of the catalyst, the resulting unsaturated material is transitory and immediately dimerizes to produce a $C_{18}$ product, namely, the dimethylperhydropyrene.

When the reaction is conducted at low temperatures such as −5° C. to 10° C., little rupturing of a ring of the methylpentalane product occurs and hence the amount of dimethylperhydropyrene formed is small. However, at temperatures in the range of 20–50° C., this ring rupturing reaction becomes substantial and a considerable amount of the product formed is the $C_{18}$ dimer. Concurrently with the formation of the dimer, there is also formed trimethylcyclohexanes in substantial yield. This type of product comes about as a result of saturation of the unsaturated intermediate resulting from rupture of the ring. Saturation of the intermediate is accompanied by an isomerization causing the formation of an equilibrium mixture of trimethylcyclohexane isomers. Accordingly these can be separated from the reaction mixture by distillation and obtained as an additional product of the process. If desired, the mixed trimethylcyclohexanes can be dehydrogenated in known manner to yield trimethylbenzenes, mainly mesitylene and pseudocumene with a small proportion of hemimellitene. Some of the trimethylcyclohexane isomers are gem compounds which will not undergo such dehydrogenation.

In an embodiment of the process preferred for use when it is desired to produce dimethylperhydropyrene in good yield, an additional hydrocarbon feed component is incorporated in the reaction mixture for the purpose of providing a material, other than the methylpentalane product, that will readily undergo cracking and trigger the dimerization reaction referred to above. The additional feed component employed for this purpose is paraffinic hydrocarbon having at least seven carbon atoms per molecule and more preferably at least eight. One or more $C_7$ or higher paraffinic hydrocarbons can be included in the reaction mixture for this purpose. Most preferably, isoparaffins are used which have a plurality of branches on the chain, such as dimethylhexanes, trimethylpentanes or any multiply branched isoparaffins of higher molecular weight. These paraffins in the presence of the aluminum halide catalyst will readily crack to form unsaturated intermediates which immediately abstract hydrogen from the unreacted hydrindane or the methylpentalane product or both and thus trigger the dimerization reaction. The paraffinic material used thus becomes converted mainly to lower isoparaffins of the $C_4$–$C_7$ range, with isobutane being the isoparaffin formed in largest amount. The reacton preferably is conducted at a temperature of —5° C. to 10° C. to avoid cracking of the methylpentalane product of the reaction. The paraffin component of the charge will readily crack under these conditions while the methylpentalane formed will not undergo any substantial amount of ring rupturing.

In the foregoing embodiment of the invention in which a paraffin component is included in the reaction mixture, it is preferable to use a molar ratio of hydrindane to the paraffin in the range of 3:1 to 10:1. At ratios in this range and using a reaction temperature in the range of —5° C. to 10° C., the reaction will proceed cleanly without substantial deactivation of the catalyst and good yields of both methylpentalane and the dimer product (dimethylperhydropyrene) can be obtained. Any unreacted hydrindane can be recovered from the reaction product and recycled for reuse.

An aluminum halide catalyst obtained by combining $AlCl_3$ with HCl or $AlBr_3$ with HBr is used to effect the reactions contemplated within the scope of the invention. With either aluminum halide the catalyst preferably is a liquid complex obtained by reacting the aluminum halide and hydrogen halide in the presence of one or more paraffin hydrocarbons having at least seven and more preferably at least eight carbon atoms. When $AlCl_3$ is used it is preferable to use paraffin hydrocarbons which have more than eight carbon atoms. This complex type of catalyst is insoluble in the reaction mixture, and the activity of the catalyst depends upon having at least a small amount of uncomplexed $AlCl_3$ or $AlBr_3$ present therein. The catalyst complex is a colored mobile liquid and typically in the case of $AlBr_3$ is bright orange-yellow. In preparing the complex any paraffin hydrocarbon or mixture of such paraffins having seven or more carbon atoms can be used, but it is desirable to use a branched paraffin, e.g., one having at least two branches, in order to reduce the time for preparing the complex and it is particularly preferred that such isoparaffins have at least eight carbon atoms per molecule. A slow degradation of the catalyst may occur over a course of time, particularly when $AlBr_3$ is used to make the catalyst, but the addition of a small amount of fresh aluminum halide from time to time will reactivate the catalyst. Also a portion or all of the catalyst complex can be replaced from time to time by fresh catalyst complex to maintain catalytic activity.

Preparation of the catalyst complex comprises dissolving or suspending the aluminum halide in the paraffin hydrocarbon and passing the hydrogen halide into the mixture. This can be done at room temperature, although the use of an elevated temperature such as 50-100° C. generally is desirable to increase the rate of reaction. For best results at least five moles of the paraffin per mole of $AlCl_3$ or $AlBr_3$ should be employed. Under these conditions some of the paraffin evidently breaks into fragments, yielding a $C_4$ fragment which becomes the hydrocarbon portion of the complex. In the case of $AlBr_3$, as the reaction proceeds the mixture becomes milky and the orange-yellow liquid complex then precipitates from the hydrocarbon phase. Addition of HBr is continued until the milky appearance has disappeared. For obtaining the most active catalyst complex the addition of HBr should be stopped at this point. When $AlCl_3$ is used to make the catalyst, such milky appearance does not appear as the HCl is added. Instead the particles of $AlCl_3$ in suspension in the hydrocarbon merely become converted to the liquid complex. The addition of HCl is stopped before all of the $AlCl_3$ reacts so that the complex formed will contain some $AlCl_3$ particles suspended therein. The resulting complexes made with either $AlCl_3$ or $AlBr_3$ are relatively stable materials having high catalytic activity.

When the aluminum halide is $AlBr_3$, the catalyst can also be used with the $AlBr_3$ dissolved in the hydrocarbon reactant so that the reaction mixture is homogeneous. When using this type of catalyst system, the $AlBr_3$ is dissolved in the hydrindane, or the mixture of hydrindane and paraffin hydrocarbon as the case may be, to the extent of 5–200% by weight on the total hydrocarbon and HBr is pressured into the mixture in amount of at least 0.25% by weight of the hydrocarbon. The resulting reaction mixture remains homogeneous as the reaction occurs. With $AlCl_3$ a homogeneous system cannot be used since $AlCl_3$ is essentially insoluble in hydrocarbons.

The present process is carried out by contacting the aluminum halide catalyst with the hydrocarbon reactant at a suitable temperature within the general range of —10° C. to 50° C. The temperature within this range should be selected in accordance with considerations as indicated above, depending upon whether or not it is desired to produce the $C_{18}$ dimer as product and whether or not a crackable paraffin component is included in the feed. When the reaction is carried out employing the catalyst in the preferred complex form as described above, the reaction mixture sould be vigorously agitated to provide intimate contact between the hydrocarbon and catalyst phases. The time allowed for reaction will vary depending largely upon the reaction temperature selected but generally should be in the range of 10 minutes to 10 hours. After the desired degree of conversion has been reached, the catalyst is separated from the hydrocarbon material and the latter can be distilled to obtain the desired product or products. When an aluminum halide complex is used as catalyst, the reaction mixture can be settled to separate the complex phase from the hydrocarbons and the catalyst complex can be recycled and reused. The hydrocarbon phase can, if desired, be washed with water to remove any catalyst residues prior to being fractionated into the desired products. When $AlBr_3$–HBr is used as a soluble catalyst, the HBr and hydrocarbons can be separately recovered by distillation from the $AlBr_3$ and the hydrocarbons can then be fractionated to yield appropriate product fractions.

The following example more specifically illustrates the invention.

EXAMPLE

A catalyst complex was prepared by bubbling HBr into a mixture of 5 g. of $AlBr_3$ and 8 ml. of mixed dimethylhexanes at about 50° C. for about 30 minutes. Thereafter the unreacted hydrocarbons were decanted from the catalyst complex layer and about 3 ml. of the layer were obtained. This was a mobile oily liquid having an orange-yellow color. The reaction was carried out in a rocker bomb by contacting the catalyst with 5 ml. of hydrindane obtained by hydrogenating indane using a Raney nickel catalyst. The hydrindane was composed of 84.1% and 15.9% by weight of its cis and trans isomers, respectively. The temperature initially was maintained at 0° C. and small samples of the hydrocarbon product were taken for analysis at total reaction times of 5, 65 and 290 minutes. Then the temperature was raised at 28–29° C., the reaction was continued and samples of the hydrocarbon product were taken at overall reaction times of 322 minutes and 562 minutes. Analytical results obtained by vapor phase chromatography are shown in the accompanying table.

Table

| Cut No. | 1 | 2 | 3 | 4 | 5 |
|---|---|---|---|---|---|
| Reaction temperature | 0° C. | 0° C. | 0° C. | 28° C. | 29° C. |
| Total reaction time, min | 5 | 65 | 290 | 322 | 562 |
| Composition of product, weight percent: | | | | | |
| $C_4$ paraffins | 2.8 | 3.0 | 2.8 | 2.7 | 1.9 |
| $C_5$ paraffins | 2.3 | 2.7 | 2.6 | 2.7 | 2.3 |
| $C_6$ paraffins | 1.5 | 1.4 | 1.4 | 1.3 | 1.1 |
| $C_7$ paraffins | 0.7 | 1.0 | 1.0 | 0.8 | 0.7 |
| $C_7$ monocyclic naphthenes | | Trace | Trace | 0.1 | 0.4 |
| $C_8$ monocyclic naphthenes | | Trace | 0.2 | 0.04 | 0.7 |
| $C_9$ monocyclic naphthenes | Trace | Trace | 0.2 | 0.6 | 13.0 |
| $C_{10}$ monocyclic naphthenes | | | | Trace | 2.1 |
| Methylpentalane | 0.6 | 25.4 | 63.5 | 57.9 | 39.7 |
| Trans-hydrindane | 55.7 | 41.5 | 16.5 | 15.7 | 9.1 |
| Cis-hydrindane | 36.1 | 23.2 | 4.0 | 2.5 | 2.5 |
| Decalin | | | | | 0.1 |
| Methyldecalin | | | | Trace | 0.1 |
| Dimethyldecalins | | | | Trace | 0.4 |
| Trimethyldecalins | 0.2 | 0.5 | 0.6 | 0.5 | 0.8 |
| Dimethylperphydropyrene | | 1.2 | 7.4 | 15.1 | 25.1 |

The data presented in the table show that reaction at 0° C. will produce methylpentalane as the major product and that only a small amount of dimethylperhydropyrene is formed even when a long reaction time such as five hours is used. However by raising the temperature to a higher level such as 25–30° C., the formation of the $C_{18}$ dimer becomes substantial and the content of methylpentalane previously formed will decrease. Concurrent with the formation of the dimer at the higher temperature level, the production of $C_9$ monocyclic naphthenes occurs to appreciable extent as shown by the 13% concentration of these components in the final reaction products.

These $C_9$ monocyclic naphthenes are essentially all trimethylcyclohexanes and include a substantial proportion of gem compounds, typically, of the order of 30%. Upon dehydrogenating the mixture of trimethylcyclohexane isomers using a platinum-on-alumina catalyst at 370° C., the product typically has the following composition by weight:

| | Percent |
|---|---|
| Undehydrogenated gem compounds | 31.2 |
| Mesitylene | 34.1 |
| Pseudocumene | 33.6 |
| Hemimellitene | 1.1 |

The undehydrogenated gem compounds can readily be distilled from the trimethylbenzenes formed and obtained as a separate product. If desired these gem compounds can be recycled to the primary reaction zone where they will equilibrate, forming additional non-gem isomers that can be dehydrogenated to increase the yield of the trimethylbenzenes.

In the specific example described above it was found that as the concentration of the dimer builds up in the reaction mixture it tends to crystallize therefrom. Thus for Cut No. 3 a small amount of crystals could be observed in the reaction mixture at 0° C. With Cut No. 4 no dimer crystals were observed at room temperature but there was considerable precipitate upon cooling to 0° C. With Cut No. 5 there was a heavy precipitate of dimer even at room temperature. It is therefore apparent that when the reaction is carried out to produce a high yield of the dimethylperhydropyrene most of it can be recovered from the other hydrocarbon products simply by filtration. The dimethylperhydropyrene which remains in solution in the liquid hydrocarbons at the filtration temperature employed can be obtained from the filtrate by distilling off the other hydrocarbons. In cases where methylpentalane is not desired as a product of the process, it and any unreacted hydrindane can be separated from the other reaction products and recycled to the reaction zone to increase the yield of dimethylperhydropyrene.

The methylpentalane produced by the present process can be converted into dicyclic $C_9$ diolefins by dehydrogenation over a suitable catalyst such as chromia-on-aluminum or copper chromite. The dicyclic diolefin product can be used as charge material for special polymerization and dimerization reactions.

I claim:

1. Method of preparing methylpentalane and dimethylperhydropyrene which comprises contacting a mixture of hydrindane and paraffin hydrocarbon having at least seven carbon atoms with an aluminum halide catalyst at a temperature in the range of −5° C. to 10° C., and separating methylpentalane and dimethylperhydropyrene from the reaction mixture.

2. Method according to claim 1 wherein the molar ratio of hydrindane to said paraffin hydrocarbon is in the range of 3:1 to 10:1.

3. Method according to claim 1 wherein said paraffin is isoparaffinic hydrocarbon having at least eight carbon atoms.

4. Method according to claim 3 wherein said catalyst is a pre-formed liquid complex obtained by reacting $AlCl_3$, HCl and paraffin hydrocarbon having at least seven carbon atoms.

5. Method according to claim 3 wherein said catalyst is a pre-formed liquid complex obtained by reacting $AlBr_3$, HBr and paraffin hydrocarbon having at least seven carbon atoms.

6. Method of making dimethylperhydropyrene which comprises contacting hydrindane and recycle material hereinafter specified with an aluminum halide catalyst at a temperature in the range of 20–50° C., whereby dimethylperhydropyrene, methylpentalane and other hydrocarbon products are formed, recovering dimethylperhydropyrene and methylpentalane separately from the reaction mixture, and utilizing the recovered methylpentalane as said recycle material.

7. Method according to claim 6 wherein said catalyst is a pre-formed liquid complex obtained by reacting $AlCl_3$, HCl and paraffin hydrocarbon having at least seven carbon atoms.

8. Method according to claim 6 wherein said catalyst is a pre-formed liquid complex obtained by reacting $AlBr_3$, HBr and paraffin hydrocarbon having at least seven carbon atoms.

9. Method of making dimethylperhydropyrene which comprises contacting hydrindane with an aluminum halide catalyst at a temperature in the range of −10° C. to 50° C., whereby isomerization occurs with the formation of methylpentalane, continuing the contacting with said catalyst at such temperature until at least a substantial amount of a separate phase comprising crystalline dimethylperhydropyrene has been formed, and separating crystalline dimethylperhydropyrene from the reaction mixture.

10. Method according to claim 9 wherein the temperature is in the range of 20–50° C.

11. Method according to claim 9 wherein the contacting with the catalyst is done in the presence of paraffin hydrocarbon having at least seven carbon atoms and at a temperature in the range of −5° C. to 10° C.

12. Method according to claim 11 wherein the molar ratio of hydrindane to paraffin hydrocarbon used is in the range of 3:1 to 10:1.

References Cited by the Examiner
UNITED STATES PATENTS 2,396,331   3/46   Marschner _____ 260—666

OTHER REFERENCES

Thomas: Anhydrous Aluminum Chloride in Organic Chemistry, p. 791 relied on, Reinhold Publishing Corporation, N.Y., 1941.

Zelinski et al.: Ber., vol. 62, pp. 1658–63, 1929.

ALPHONSO D. SULLIVAN, *Primary Examiner.*